(12) United States Patent
Nickolls et al.

(10) Patent No.: US 8,271,763 B2
(45) Date of Patent: Sep. 18, 2012

(54) UNIFIED ADDRESSING AND INSTRUCTIONS FOR ACCESSING PARALLEL MEMORY SPACES

(75) Inventors: John R. Nickolls, Los Altos, CA (US); Brett W. Coon, San Jose, CA (US); Ian A. Buck, San Jose, CA (US); Robert Steven Glanville, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 342 days.

(21) Appl. No.: 12/567,637

(22) Filed: Sep. 25, 2009

(65) Prior Publication Data

US 2011/0078406 A1   Mar. 31, 2011

(51) Int. Cl.
*G06F 12/10* (2006.01)
(52) U.S. Cl. ............. 711/202; 711/147; 711/E12.058
(58) Field of Classification Search ............ 711/147, 711/149, 202, 203, E12.058
See application file for complete search history.

(56) References Cited

U.S. PATENT DOCUMENTS

| | | | |
|---|---|---|---|
| 5,854,638 | A | 12/1998 | Tung |
| 6,999,088 | B1 | 2/2006 | Van Dyke et al. |
| 7,339,590 | B1 | 3/2008 | Moskal et al. |
| 2004/0186921 | A1 | 9/2004 | Wolrich et al. |
| 2007/0296729 | A1 | 12/2007 | Du et al. |
| 2009/0240895 | A1 | 9/2009 | Nyland et al. |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

International Search Report, PCT Appl. No. PCT/US 10/50240, mailed Dec. 28, 2010.
Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.

*Primary Examiner* — Pierre-Michel Bataille
(74) *Attorney, Agent, or Firm* — Patterson & Sheridan, LLP

(57) ABSTRACT

One embodiment of the present invention sets forth a technique for unifying the addressing of multiple distinct parallel memory spaces into a single address space for a thread. A unified memory space address is converted into an address that accesses one of the parallel memory spaces for that thread. A single type of load or store instruction may be used that specifies the unified memory space address for a thread instead of using a different type of load or store instruction to access each of the distinct parallel memory spaces.

20 Claims, 9 Drawing Sheets

32 bit Unified Address 520

| 31      24 | 23                  0 |
|---|---|
| Short Address 522 ||

32 bit Unified Address 525

| 31      24 | 23                  0 |
|---|---|
| SWin 414 | Shared Address 526 |

32 bit Unified Address 530

| 31      24 | 23                  0 |
|---|---|
| LWin 412 | Local Address 536 |

32 bit Shared Memory Space Address 540

| 31      24 | 23                  0 |
|---|---|
| 0 | Shared Address 546 |

32 bit Local Memory Space Address 550

| 31      24 | 23                  0 |
|---|---|
| 0 | Local Address 556 |

Figure 5B

UNIFIED ADDRESSING AND INSTRUCTIONS FOR ACCESSING PARALLEL MEMORY SPACES

BACKGROUND OF THE INVENTION

1. Field of the Invention

The present invention generally relates to memory systems and more specifically to unifying the addressing of multiple distinct memory spaces into a single address space.

2. Description of the Related Art

Performance requirements are constantly increasing in data processing systems. Multiple processing units may be configured to operate in parallel by the execution of multiple parallel threads. For some applications the multiple parallel threads execute independently. For other applications, the multiple parallel threads share some data. For example, a first thread may compute an input that is used by one or more other threads. Finally, the threads may be organized in groups, where data is shared within each group, but not between groups.

Multithreaded parallel programs written using a programming model such as the CUDA™ C (general purpose parallel computing architecture) and PTX™ (a low-level parallel thread execution virtual machine and virtual instruction set architecture) provided by NVIDIA® access two or more distinct memory address spaces each having a different parallel scope, e.g., per-thread private local memory, per-group shared memory, and per-application global memory. The programmer specifies the memory address space in each variable declaration and typically uses a load and store instruction specific to that memory address space when accessing the variable. For example, three different sets of load/store memory access instructions may be used to access three distinct memory spaces that have different parallel sharing scope. A first set of load/store memory access instructions may be used to access local memory that is private to each thread. A second set of load/store memory access instructions may be used to access shared memory that is shared between all threads in a single group. A third set of load/store memory access instructions may be used to access global memory that is shared by all threads in all groups.

The correct memory access instruction must be used to reference a pointer in a language like C/C++. Therefore, when a program fails to specify a memory address space for a pointer reference, the memory address space is determined by a compiler and the specific load or store instruction is inserted into the compiled program, prior to execution of the program. Additionally, the correct address that lies within the memory address space must be specified for the memory access instruction. When a C/C++ function is compiled separately from the calling code, the compiler does not know which memory space a pointer passed as a function argument references, and therefore does not know which memory access instruction to insert. Similarly, when a function is called from multiple calling points with pointer arguments to different memory spaces, or via a pointer to the function, the compiler cannot determine which memory access instruction to insert. A sequence of several instructions must be inserted into a program to access the correct memory space for arbitrary pointers that point to any of the memory spaces having a different scope. Inserting sequence of several instructions works for some static compile-time cases, but is not sufficient for dynamic cases, such as multiple calls to a library function via a function pointer, or separately-compiled functions.

Accordingly, what is needed in the art is a technique that enables a program to use a common load or store instruction to access memory spaces that each have a different scope.

SUMMARY OF THE INVENTION

One embodiment of the present invention sets forth a technique that enables a program to use a common load or store instruction to access distinct parallel memory spaces having different scopes. A unified memory space address is converted into an address that accesses only one of the parallel memory spaces. One advantage of the unified memory space address conversion is that a single type of load or store instruction may be used that specifies the unified memory space address instead of using a different type of load or store instruction to access each of the distinct parallel memory spaces.

Various embodiments of a method of the invention for accessing separate parallel memory spaces using a unified memory space address include extracting a parallel memory space window position from a field in the unified memory space address, converting the unified memory space address to a local memory address for each thread when the parallel memory space window position corresponds to a local memory space, converting the unified memory space address to a shared memory address for each thread array when the parallel memory space window position corresponds to a shared memory space, and converting the unified memory space address to a global memory address when the parallel memory space window position does not correspond to either the local memory space or the shared memory space. The unified memory space addresses within each thread's local memory space window are accessible by that thread. The unified memory space addresses within each thread array's shared memory space window are accessible by threads in that thread array. The unified memory space addresses within the global memory space window are accessible by all threads in all thread arrays.

Various embodiments of the invention include a processor configured to access separate parallel memory spaces using a unified memory space address by extracting a parallel memory space window position from a field in the unified memory space address, converting the unified memory space address to a local memory address when the parallel memory space window position corresponds to a local memory space, converting the unified memory space address to a shared memory address when the parallel memory space window position corresponds to a shared memory space, and converting the unified memory space address to a global memory address when the parallel memory space window position does not correspond to either the local memory space or the shared memory space. The unified memory space addresses within each thread's local memory space window are accessible by that thread. The unified memory space addresses within each thread array's shared memory space window are accessible by threads in that thread array. The unified memory space addresses within the global memory space window are accessible by all threads in all thread arrays.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B illustrates 32 bit unified address formats, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
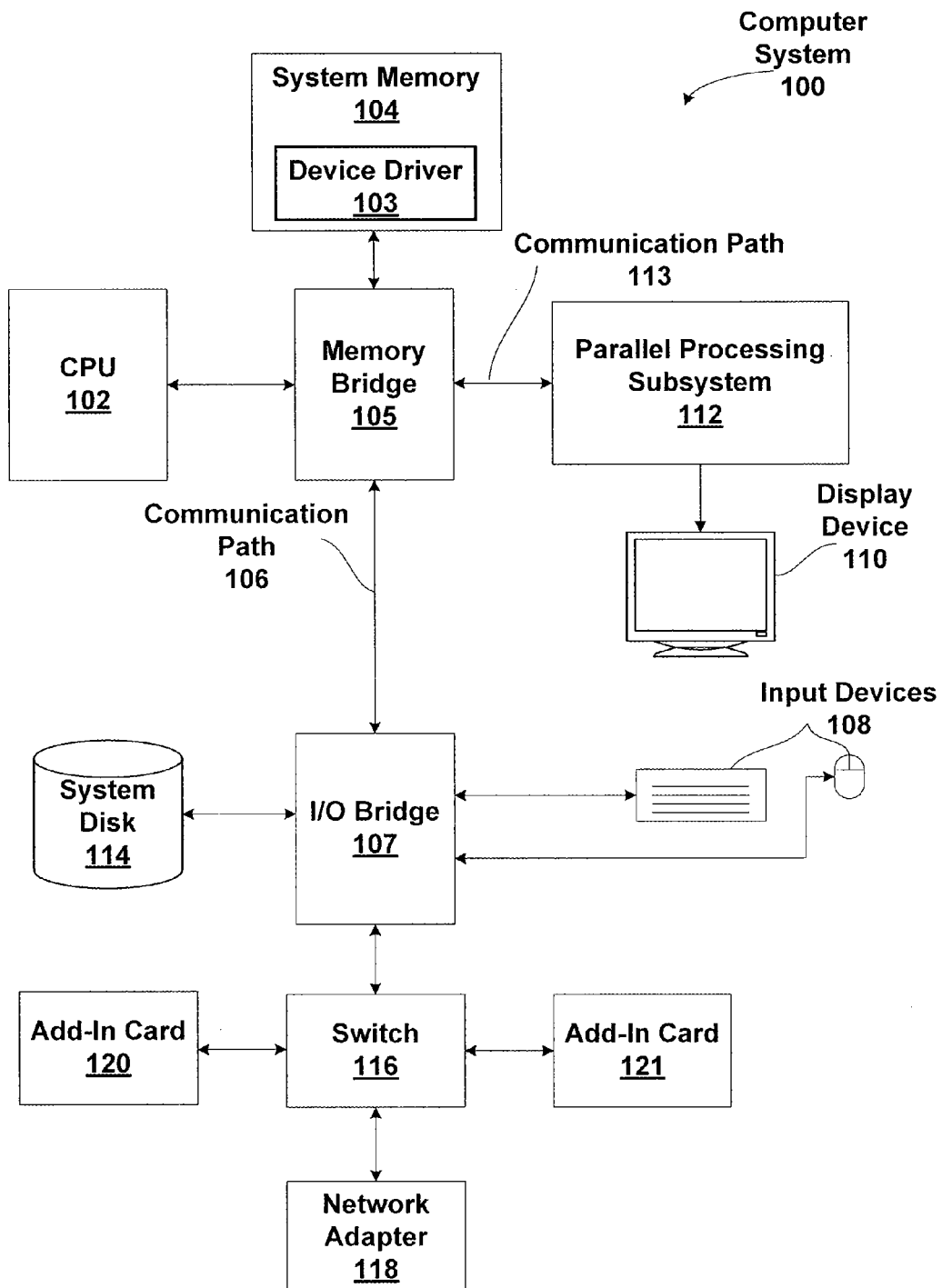
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
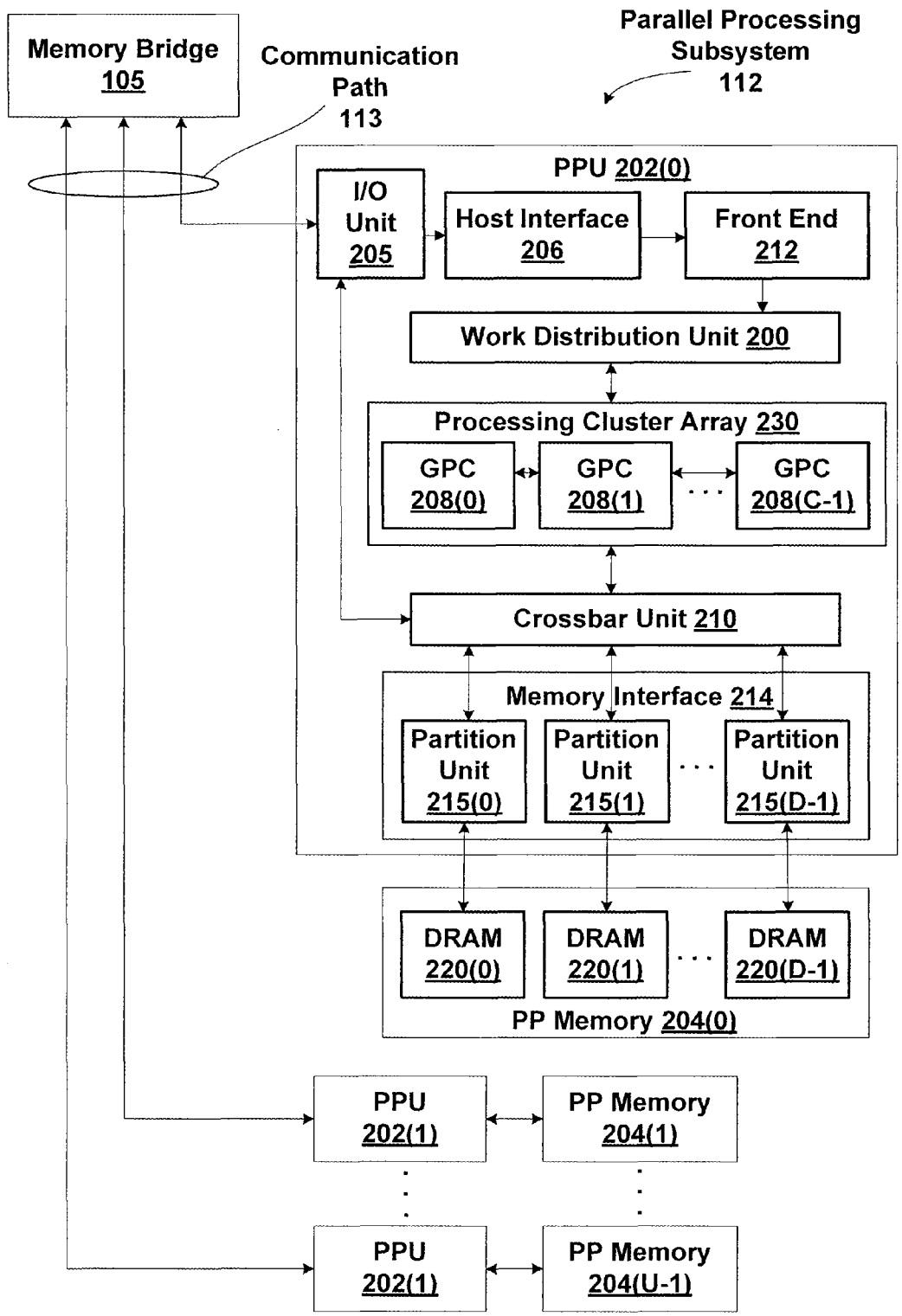
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device (s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
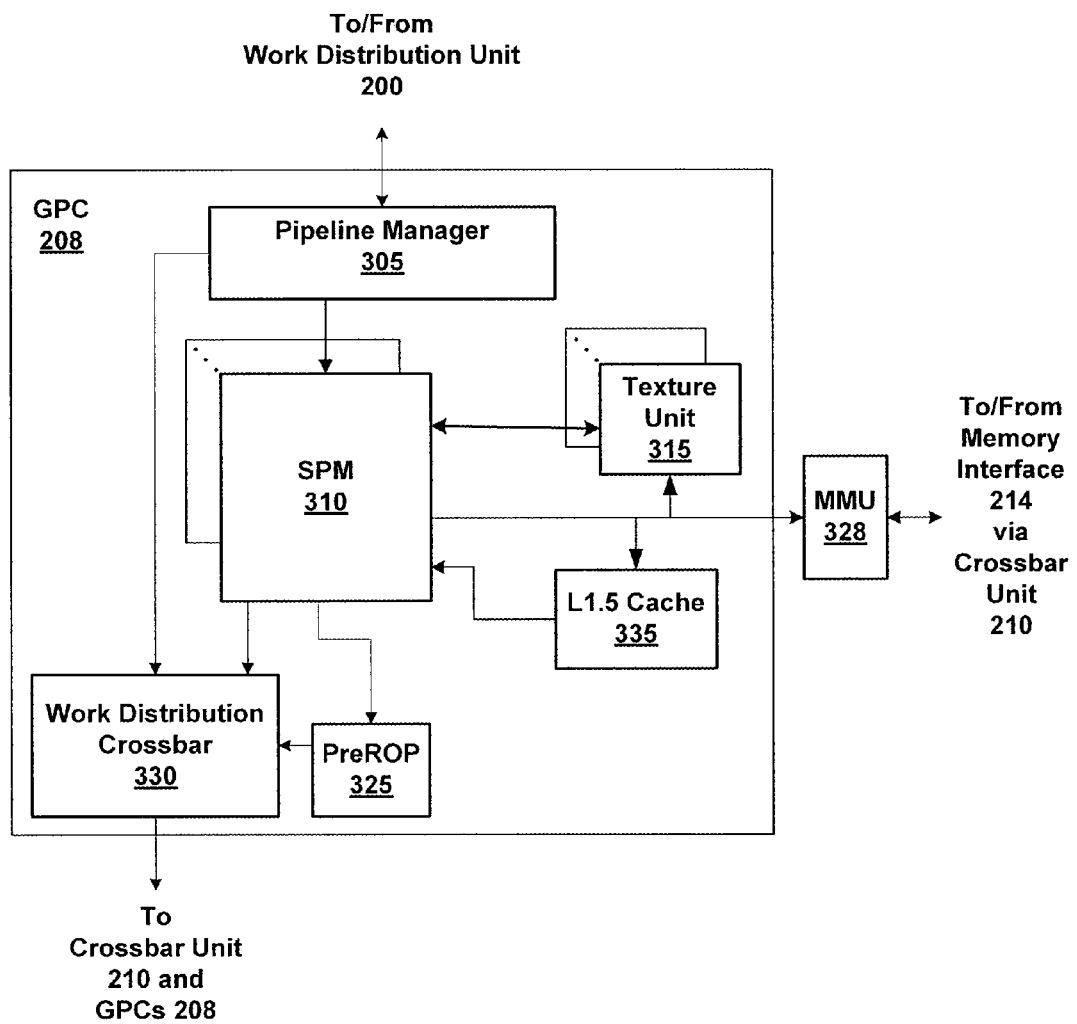
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional execution units (e.g., arithmetic logic units and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CIA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208.

The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from L1 cache within SPM 310, and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
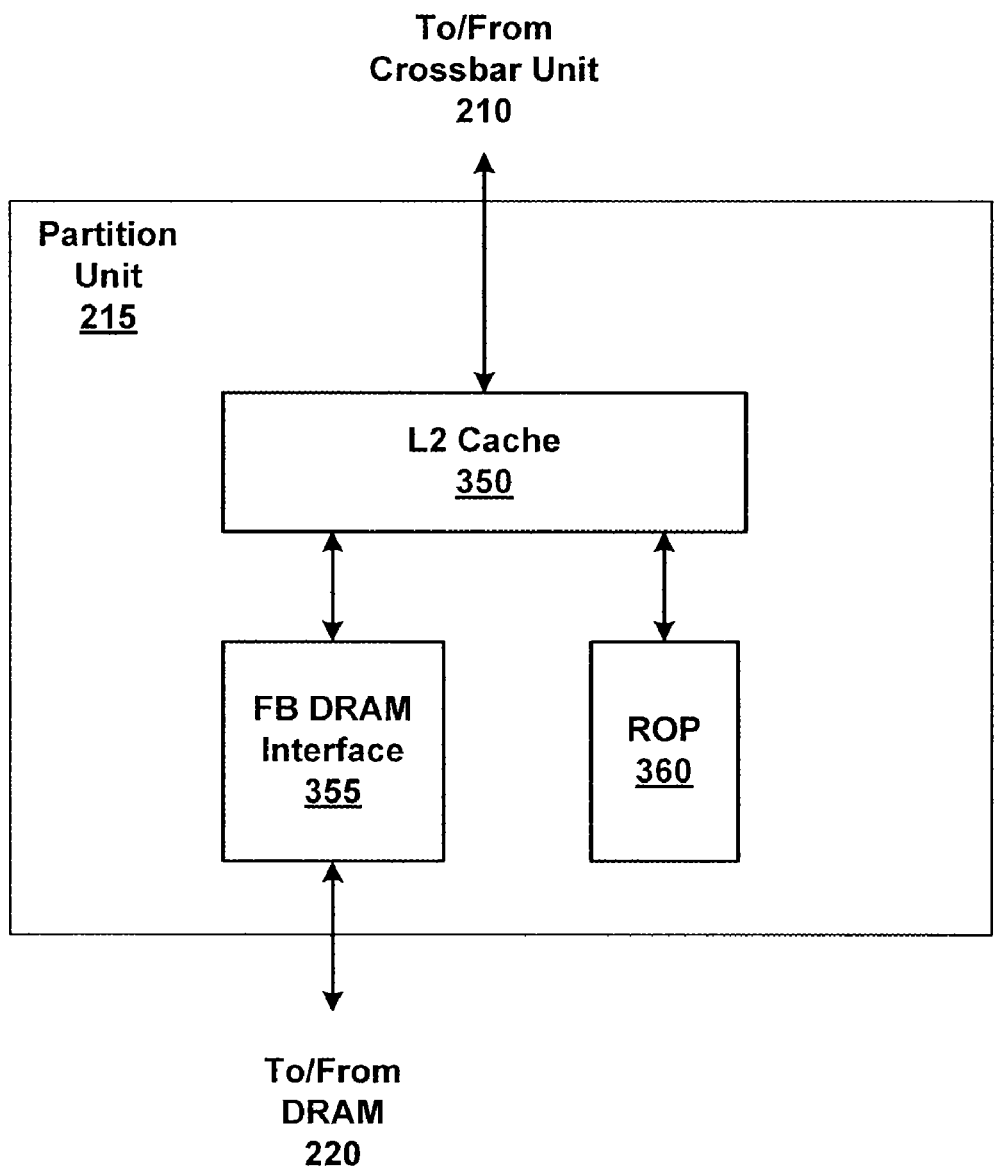
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Unified Addressing to Access Parallel Memory Spaces

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
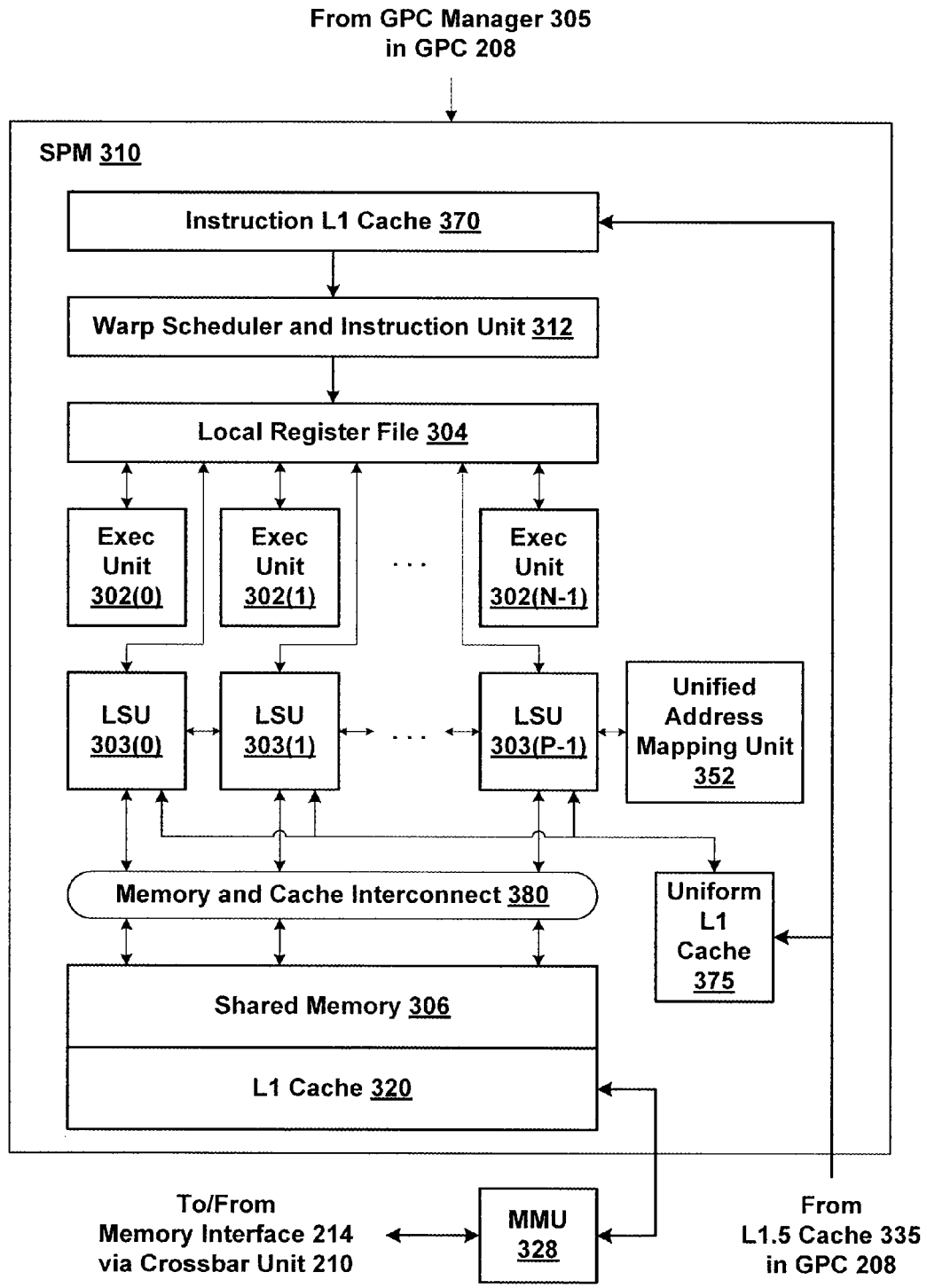
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

In a prior parallel processing system, a programmer or compiler must use the correct memory access instructions to access each distinct parallel memory space accessible to a thread when referencing a pointer in a language like C/C++, which was originally designed for serial processors with a single memory space. For example, a variable is declared as residing in one of the distinct parallel memory spaces, e.g. per-thread local memory, per-CTA shared memory, or per-application global memory, and the variable is accessed using a corresponding load or store instruction, e.g., load.global, store.global, load.local, store.local, load.shared, and store.shared. In contrast with conventional systems, each load-store unit LSU 303 in SPM 310 employs a unified address mapping unit 352 that converts an address provided for load and store instructions that are specified in a unified memory space into an address in each distinct memory space. Consequently, a unified access instruction, e.g., load or store, may be used to access any of the local, shared, or global memory spaces by specifying an address in the unified memory space.

At the application and compiler level the distinct memory spaces appear within a single unified address space. Therefore unified memory access instructions are used, instead of separate load and store instructions for each distinct memory space. A C/C++ program may use one unified pointer and one unified access instruction to efficiently access any of the three distinct address spaces. An example unified load instruction format is: LD.32 Rd, [Ra+offset]; which executes on a group of P parallel threads, and loads each thread's register Rd with 32 bits of data from memory at each unified byte address specified by the sum of each thread's register Ra plus offset. An example unified store instruction format is: ST.32 [Ra+offset], Rb; which executes on a group of P parallel threads, and stores 32 bits of data from each thread's register Rb to memory at each unified byte address specified by the sum of each thread's register Ra plus offset.

The unified address space has one or more windows that each map addresses in the unified address space to addresses in the distinct memory spaces, e.g., local, shared, and global. Each thread of a group of parallel threads (thread group) has its own private per-thread local address space corresponding to the local memory space. The windows are positioned at the same unified address for all threads, but each thread's access to the local memory is steered to its private local memory space. Similarly, each CTA or thread array has its own per-thread array address space corresponding to the shared memory space. Each thread's access to the shared memory is steered to the shared memory space for the thread's thread array.

Figure 4:
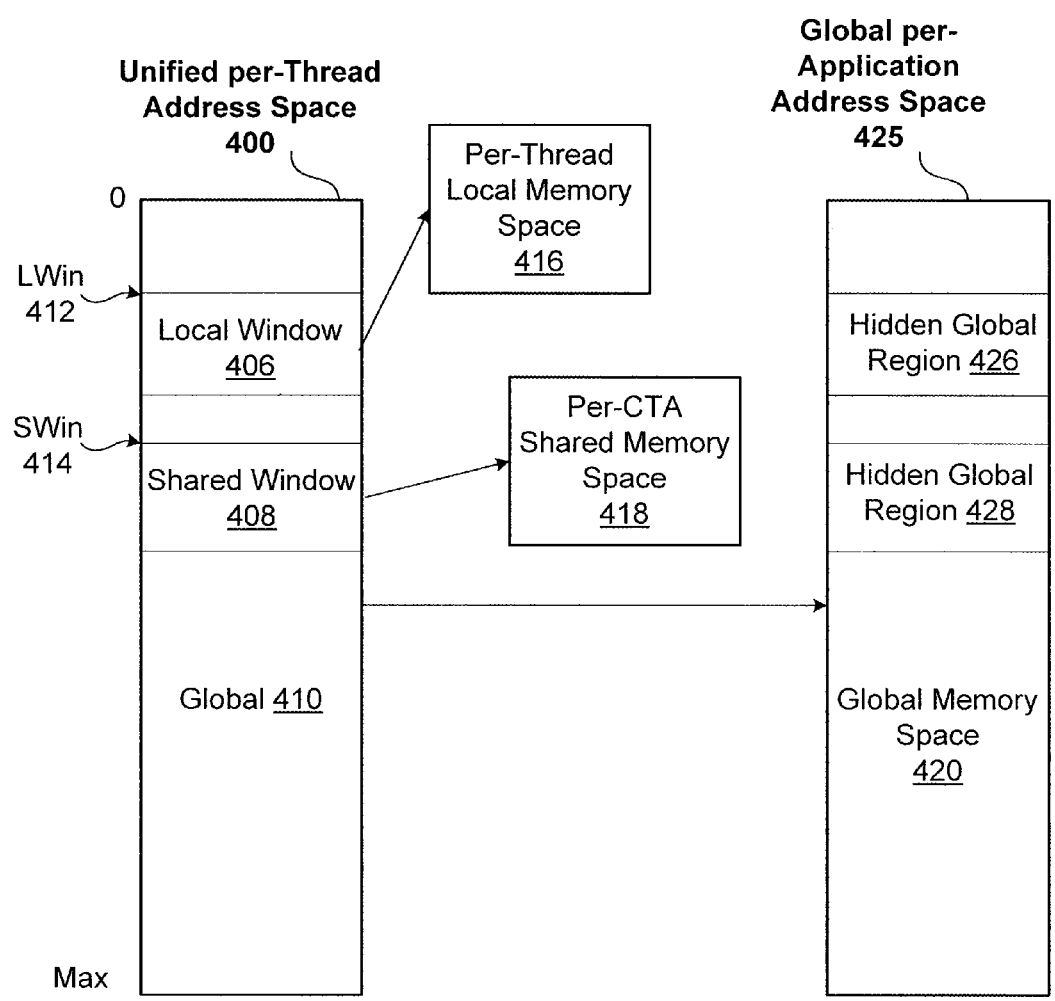
FIG. 4 is a conceptual diagram of the mapping from the unified address space to the parallel memory address spaces, according to one embodiment of the present invention.

FIG. 4 is a conceptual diagram of the mapping from the unified per-thread address space 400 to the distinct parallel memory address spaces, according to one embodiment of the present invention. Unified memory access instructions (load and store) calculate an effective address within the unified address space (between 0 and Max). A typical memory access instruction adds a register value plus an immediate offset to form the effective unified memory space address. One or more of the distinct parallel memory spaces may be a physical memory space or a virtual memory space that is further mapped to a physical memory space by the MMU 328, which may employ a conventional address translation lookaside buffer (TLB) or address translation cache.

The unified per-thread address space 400 includes two windows, a local window 406 and a shared window 408. Unified memory space addresses within the local window 406 are mapped to addresses within the per-thread local memory space 416 by the unified address mapping unit 352. Unified memory space addresses within the shared window 408 are mapped to addresses within the per-thread-array shared memory space 418 by the unified address mapping unit 352. Accesses outside of the local window 406 and the shared window 408 in global 410 are mapped to the global memory space 420 within the global per-application address space 425. The local window 406 is positioned at unified memory space address LWin 412 and the shared window 408 is positioned at unified memory space address SWin 414.

The windows within the unified per-thread address space 400 can be implemented in several ways. One way is to define the unified per-thread address space 400 the concatenation of the distinct memory spaces, global memory space 420, local memory space 416 and shared memory space 418. As shown in FIG. 4, the unified per-thread address space 400 is the same size as the largest address space, (the global memory space 420), and specifies smaller window sizes that are large enough to address the smaller distinct parallel memory spaces. Because the per-thread local memory space 416 and per-thread-array shared memory space 418 are much smaller than the global memory space 420, the local window 406 and shared window 408 obscure only a small region of the global memory space 420, shown as hidden local window 426 and hidden shared window 428. The positions of local window 406 and shared window 408 (LWin 412 and SWIn 414) may be adjustable to meet operating system constraints. Importantly, hidden local window 426 and hidden shared window 428 should be positioned in the unified per-thread address space 400 such that the portion of global memory space 420 that is hidden by windows is not accessed by an application program, because the hidden portions of global memory space 420 may not be accessed using a unified load or store instruction.

One embodiment uses 16 MB (24-bit) window sizes for local window 406 and shared window 408 in a 1 TB (40-bit) unified per-thread address space 400. The memory access instructions (load and store) use 64-bit registers to hold 40-bit unified memory space addresses, with zeros in the most-significant 24 bits. Local window 406 and shared window 408 may be aligned to 16 MB boundaries, equal to the window size, to simplify the hardware implementation. Various other embodiments may use different window sizes as needed.

Figure 5A:
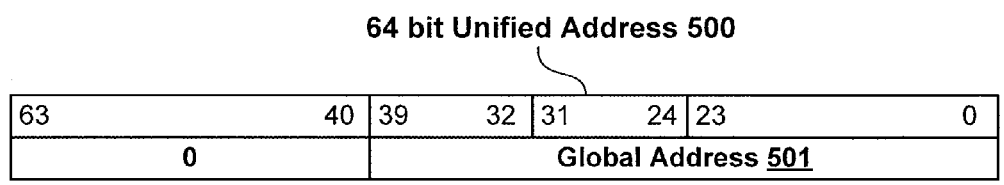
FIG. 5A illustrates 64 bit unified address formats, according to one embodiment of the present invention.
Figure 5A:
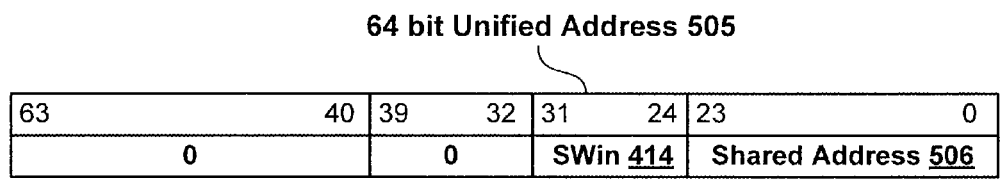
Figure 5A:
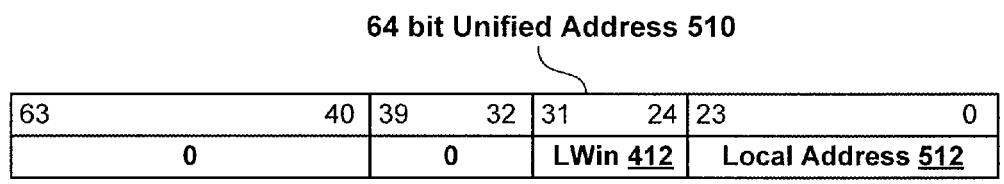

FIG. 5A illustrates 64 bit unified address formats 500, 505, and 510, according to one embodiment of the present invention. A 64-bit unified address for a unified load or store instruction that references a 40-bit global memory space address 501 may include the global memory space address 501 in the lower 40 bits of the 64 bit unified address 500. The global memory space addresses hidden behind the two window positions at LWin 412 and SWin 414 are within hidden local window 426 and hidden shared window 428 and cannot be accessed by unified global memory space address 501. System software adjusts LWin 412 and SWin 414 to hide global memory space addresses that the application does not need to access.

A 64-bit unified address 505 for a unified load or store instruction that references a shared memory space address within the shared window 408 specifies the shared memory address 506 as address bits[23:0], selects the shared window 408 by placing SWin 414 in address bits[31:24], and zeros in the upper address bits [63:32]. Similarly, a unified address 510 within the local window 406 specifies the local memory address 512 as address bits[23:0], selects the local window 406 by placing LWin 412 in address bits[31:24], and zeros in the upper address bits [63:32].

FIG. 5B illustrates 32 bit unified address formats 520, 525, and 530, and specific memory space address formats 540 and 550, according to one embodiment of the present invention. A short 32-bit unified address may reference only the low 4 GB of the unified per-thread address space 400 specified by the short address 522. A short 32-bit unified address for a unified load or store instruction that references a shared memory address within the shared window 408 specifies the shared memory address 526 as address bits[23:0] and selects the shared window with SWin 414 in address bits[31:24]. A short 32-bit unified address for a unified load or store instruction that references a local memory address within the local window 406 specifies the local memory address 536 as address bits[23:0] and selects the local window with LWin 412 in address bits[31:24]. The short 32-bit unified address limits the window positions to the lower 4 GB of the unified per-thread address space 400, and also limits global memory accesses to the lower 4 GB of the unified per-thread address space 400.

In addition to the unified address instructions, the conventional instructions for specific memory spaces are retained for compatibility, e.g. load.global, store.global, load.local, store.local, load.shared, and store.shared. A memory-space-specific address for a load.local or store.local instruction specifies the local memory space address 550 as local address 556 in address bits[23:0], and zeros the upper address bits. Similarly, a memory-space-specific address for a load.shared or store.shared instruction specifies the shared memory space address 540 as shared address 546 in address bits[23:0], and zeros the upper address bits.

Some embodiments use 16 MB (24-bit) for local window 406 and shared window 408 in a 1 TB (40-bit) unified per-thread address space 400. Local window 406 and shared window 408 may be aligned to 16 MB (24-bit) boundaries, equal to the 16 MB window size, to simplify the hardware implementation. Various other embodiments may use any sizes where the windows are smaller than the unified per-thread address space 400.

The unified address mapping unit 352 receives the unified memory space addresses and detects when a unified memory space address falls in the local window 406 or the shared window 408 by performing equality comparisons on address bits[31:24] with LWin[31:24] and SWin[31:24], and a zero comparison on the higher address bits[63:32]. Pseudocode for using 64-bit unified memory space addresses provided with a unified load instruction is shown in TABLE 1.

TABLE 1

```
// There are 24 address bits within a 16 MB Window
#define WINMASK 0x0000000000FFFFFF
// Load register from 64-bit unified memory space address
If ((address & ~WINMASK) == LWin)         // address falls in local
                                           window
    Load from Local memory with address[23:0];
else if ((address & ~WINMASK) == SWin)    // address falls in shared
                                           window
    Load from Shared memory with address[23:0];
else                                      // address falls in global
                                           memory
    Load from Global memory with address[39:0];
```

Although the unified memory space addresses are described in the context of the load and store operations, other memory access instructions beyond load and store may use unified addresses. Example instructions include atomic memory operation read-modify-write instructions, reduction operation read-modify-write instructions, cache control instructions that use memory addresses, including pre-fetch a cache line corresponding to a unified address into a cache, invalidate a cache line corresponding to a unified address, query cache status at a unified address. These other instructions are also used to access to global memory, shared memory, and local memory using just one unified address and unified memory instruction.

Once the unified memory space address is converted into a local, shared, or global memory space address, further address mappings may be applied. For example, in one embodiment, the global memory space address is a virtual address that is mapped to a physical address by MMU 328, e.g. with a page table and a translation lookaside buffer (TLB). The local memory space address for each thread may be mapped to a per-thread virtual memory address using the thread ID number. The shared memory address for each CTA may be mapped to a physical RAM address using the CTA ID number. Furthermore, the actual load or store operation may access a cache in a cached memory hierarchy, e.g., L1 cache 320, or directly access a specified RAM. For example, in one embodiment, the shared memory space resides in an on-chip RAM, while the local and global memory spaces reside within an on-chip cache hierarchy and an off-chip DRAM memory system.

Figure 6:
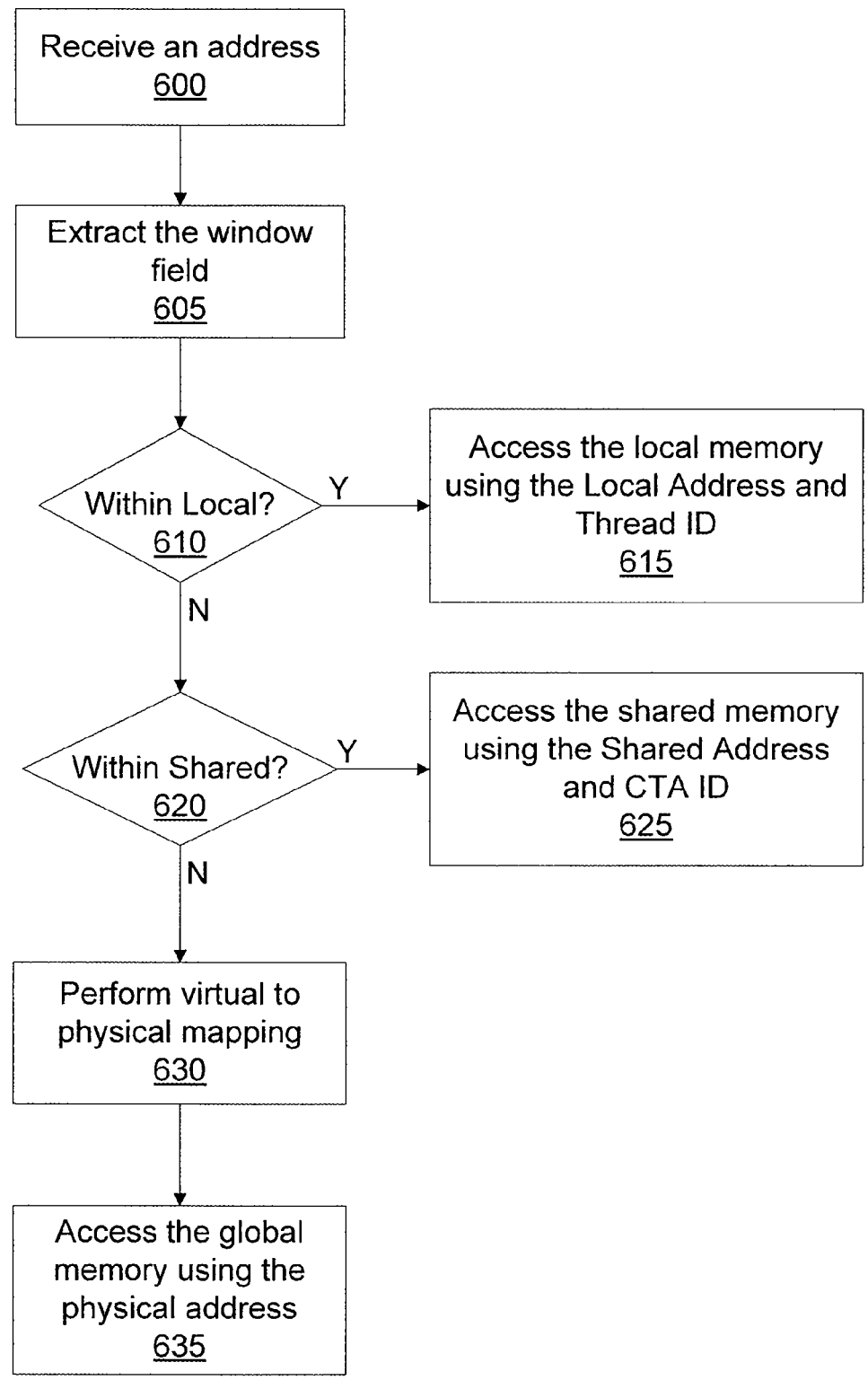
FIG. 6 is a flow diagram of method steps for converting the unified address into a parallel memory space address, according to one embodiment of the present invention.

FIG. 6 is a flow diagram of method steps for converting the unified address into a parallel memory space address, according to one embodiment of the present invention. Although the method steps are described in conjunction with the systems of FIGS. 1, 2, 3A, 3B, and 3C, persons skilled in the art will understand that any system configured to perform the method steps, in any order, is within the scope of the inventions. At step 600 the unified address mapping unit 352 receives a unified memory space address. At step 605 the unified address mapping unit 352 extracts the window field from the unified memory space address. When unified address bits [63:32] are zero, the window field is in bits [31:24] and contains SWin 414 or LWin 412 if the unified address falls in the shared or local window. At step 610 the unified address mapping unit 352 determines if the value in the window field falls within the local memory space. When the upper bits are zero and the value in the window field matches LWIN, the unified address mapping unit 352 proceeds to access the local memory space, e.g., a per-thread local memory address via L1 cache 320, at step 615 using the local address that is extracted from the unified memory space address and the thread ID. Otherwise, the unified address mapping unit 352 proceeds to step 620 and determines if the value in the window field falls within the shared memory space. When the upper bits are zero and the value in the window field matches SWIN, the unified address mapping unit 352 proceeds to access the per-CTA shared memory space, e.g., shared memory 306, at step 625 using the shared address that is extracted from the unified memory space address and the CTA ID.

Otherwise, the unified memory space address falls within the global memory space and unified address mapping unit 352 proceeds to step 630. The unified address mapping unit 352 outputs the global memory space address to the L1 cache 320 to access the global memory space, and at step 630 the global address may be mapped from a virtual address to a physical address by the MMU 328. At step 635 the MMU 328 accesses the global memory using the physical address to complete the load or store operation.

Unifying the addressing of multiple distinct parallel memory spaces into a single address space enables the use of a single type of load or store instruction instead of a different type of load and store instruction for each of the distinct parallel memory spaces. The programming is simplified and compilation of a program that accesses the different parallel memory spaces is simplified since the translation from the unified memory space to the distinct parallel memory spaces is performed as the program is executed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A processing unit configured to allow separate parallel memory spaces to be accesses using a unified memory space address, the processing unit comprising:
a mapping unit configured to:
extract a value from a window field in the unified memory space address; and
determine whether the value corresponds to a local memory space, wherein unified memory space addresses within the local memory space window are accessible by individual threads;
if the value corresponds to the local memory space, then map the unified memory space address to a local memory address that is accessible by a thread; or
if the value does not correspond to the local memory space, then determine whether the value corresponds to a shared memory space, wherein unified memory space addresses within the shared memory space window are accessible by threads in thread arrays;
if the value corresponds to the shared memory space, then map the unified memory space address to a shared memory address that is accessible by threads in a thread array; or
if the value does not correspond to the shared memory space, then map the unified memory space address to a global memory address, wherein unified memory space addresses within the global memory space window are accessible by all threads in all thread arrays.

2. The processing unit of claim 1, wherein the local memory space is excluded from a global memory space to produce a hidden region within the global memory space that cannot be addressed through the unified memory space address.

3. The processing unit of claim 1, wherein the shared memory space is excluded from a global memory space to produce a hidden region within the global memory space that cannot be addressed through the unified memory space address.

4. The processing unit of claim 1, wherein the local memory space comprises a per-thread private memory.

5. The processing unit of claim 1, wherein each of the local memory space, the shared memory space, and a global memory space comprises off-chip memory that is capable of being cached on-chip.

6. The processing unit of claim 1, wherein the shared memory space comprises a per-thread array memory shared by all threads of the thread array.

7. A computing device, comprising:
a processing unit that includes a mapping unit configured to:
extract a value from a window field in the unified memory space address; and
determine whether the value corresponds to a local memory space, wherein unified memory space addresses within the local memory space window are accessible by individual threads;

if the value corresponds to the local memory space, then map the unified memory space address to a local memory address that is accessible by a thread; or if the value does not correspond to the local memory space, then determine whether the value corresponds to a shared memory space, wherein unified memory space addresses within the shared memory space window are accessible by threads in thread arrays;

if the value corresponds to the shared memory space, then map the unified memory space address to a shared memory address that is accessible by threads in a thread array; or if the value does not correspond to the shared memory space, then map the unified memory space address to a global memory address, wherein unified memory space addresses within the global memory space window are accessible by all threads in all thread arrays.

8. A method of accessing separate parallel memory spaces using a unified memory space address, the method comprising:

extracting a value from a window field in the unified memory space address; and determining whether the value corresponds to a local memory space, wherein unified memory space addresses within the local memory space window are accessible by individual threads;

if the value corresponds to the local memory space, then mapping the unified memory space address to a local memory address that is accessible by a thread; or if the value does not correspond to the local memory space, then determining whether the value corresponds to a shared memory space, wherein unified memory space addresses within the shared memory space window are accessible by threads in thread arrays;

if the value corresponds to the shared memory space, then mapping the unified memory space address to a shared memory address that is accessible by threads in a thread array; or if the value does not correspond to the shared memory space, then mapping the unified memory space address to a global memory address, wherein unified memory space addresses within the global memory space window are accessible by all threads in all thread arrays.

9. The method of claim 8, wherein the local memory space is excluded from the global memory space to produce a hidden region within the global memory space that cannot be addressed through the unified memory space address.

10. The method of claim 8, wherein the shared memory space is excluded from the global memory space to produce a hidden region within the global memory space that cannot be addressed through the unified memory space address.

11. The method of claim 8, wherein the local memory space comprises is a per-thread private memory.

12. The method of claim 8, wherein each of the local memory space, the shared memory space, and the global memory space comprises off-chip memory that is capable of being cached on-chip.

13. The method of claim 8, wherein the shared memory space comprises a per-thread array memory shared by all threads of the thread array.

14. The method of claim 8, further comprising mapping the global memory address to a physical memory address when the global memory address is a virtual address.

15. A computer-readable storage medium storing instructions that, when executed by a processor, cause the processor to access separate parallel memory spaces using a unified memory space address, by performing the steps of:

extracting a value from a window field in the unified memory space address; and determining whether the value corresponds to a local memory space, wherein unified memory space addresses within the local memory space window are accessible by individual threads;

if the value corresponds to the local memory space, then mapping the unified memory space address to a local memory address that is accessible by a thread; or if the value does not correspond to the local memory space, then determining whether the value corresponds to a shared memory space, wherein unified memory space addresses within the shared memory space window are accessible by threads in thread arrays;

if the value corresponds to the shared memory space, then mapping the unified memory space address to a shared memory address that is accessible by threads in a thread array; or if the value does not correspond to the shared memory space, then mapping the unified memory space address to a global memory address, wherein unified memory space addresses within the global memory space window are accessible by all threads in all thread arrays.

16. The computer-readable storage medium of claim 15, wherein the local memory space is excluded from the a global memory space to produce a hidden region within the global memory space that cannot be addressed through the unified memory space address.

17. The computer-readable storage medium of claim 15, wherein the shared memory space is excluded from a global memory space to produce a hidden region within the global memory space that cannot be addressed through the unified memory space address.

18. The computer-readable storage medium of claim 15, wherein the local memory space comprises a per-thread private memory.

19. The computer-readable storage medium of claim 15, wherein each of the local memory space, the shared memory space, and a global memory space comprises off-chip memory that is capable of being cached on-chip.

20. The computer-readable storage medium of claim 15, wherein the shared memory space comprises a per-thread array memory shared by all threads of the thread array.

* * * * *